Patented May 26, 1936

2,041,727

UNITED STATES PATENT OFFICE 2,041,727

METHOD OF OPENING BIVALVES

Herbert F. Prytherch and Vera Koehring, Beaufort, N. C.

No Drawing. Application April 15, 1933, Serial No. 666,553

16 Claims. (Cl. 17—45)

(Granted under the act of March 3, 1883, as amended April 30, 1928; 370 O. G. 757)

The invention described herein may be manufactured and used by or for the Government of the United States for governmental purposes only, without the payment to us of any royalty thereon.

This invention relates to methods of opening the shell of oysters and other bivalves for such purposes as removal of the meat, pearl culture, purification, and the like, and has for its object to render such procedure less difficult, less expensive and more expedient and efficient.

We are aware that access to the flesh of shellfish has been obtained heretofore by forcible means such as breaking or puncturing the shell or prying it open with knives and similar instruments. Such methods involve considerable labor and skill and may result in injury to the tissues of the shellfish and contamination of the meat by inclusion of foreign substances such as sand, mud, particles of shell, and the like.

It is known that the difficulties experienced in opening oysters and similar shellfish are due to the close fitting of the valves and particularly to the contraction and holding power of the strong muscle or muscles that hold the valves together.

It is a purpose of this invention to show how, by certain treatments, the muscle or muscles of shellfish may be caused to relax and thus allow the automatic opening of the shell. The shell of a bivalve opens when the muscle relaxes. It is held open by the hinge cushion which, like a spring wedge, exerts considerable pressure on the valves, forcing them apart.

Our invention consists in causing the muscle or muscles of bivalves to relax, by either physical or chemical treatment or both, so as to produce opening of the shell. Our investigations have established the fact that stimulation of bivalves by physical and chemical agencies, acting together or independently, will produce muscular relaxation and cause the shell to open automatically. For this purpose a combination of physical and chemical agents has been found to be most efficient and practical.

The bivalves may be jarred or shocked by dropping them on a hard surface or by shaking them together or by any other suitable means, which action has been found to stupefy the bivalves and speeds the action of the chemical. A shock by spraying with water has been found beneficial in the removal of sand, mud, and other débris from the shells.

The bivalves are placed in a solution of either sea water, artificial salt water or fresh water, to which a small amount of chemical, preferably an acid, has been added. This step may follow the shocking step or the shocking step may be omitted. For this purpose acetic acid or hydrochloric acid is suitable and when added in sufficient amount to produce muscular relaxation will not injure the tissues nor impair their taste and food value. This treatment will produce muscular relaxation and shell opening within a short period, approximately ten to thirty minutes, when used after the above physical stimulation and when acid is added in such amounts as to increase the hydrogen-ion concentration of the salt or fresh water to pH values varying from 2 to 5.

The bivalves will remain open for a sufficient period of time to allow for such operations as removal of the meat, implantation of pearl nuclei, washing the meat with antiseptic solutions, and the like. During this period the bivalves are in the state of narcosis from which they will recover if returned within a reasonable time to the medium in which they normally exist. Oysters and other marine bivalves that have been caused to relax and open by the above and similar treatments have been found to fully recover and resume growth and normal activity when replaced in sea water.

The use of an acid treatment is of value, not only for producing opening of the shell, but also for improving the condition of the meats that are removed for market. The increased hydrogen-ion concentration of the treatment solution inhibits the growth and reproduction of bacteria and spoilage organisms and apparently destroys a large number of these forms.

For example, in the preparation of a successful acid bath for opening bivalves 2 cubic centimeters of commercial hydrochloric acid (HCl) is added to each liter of water, or in other words, approximately 2 fluid ounces of acid to every 7 gallons of water. When commercial acetic acid ($CH_3COOH$) is used 4 ounces of acid are required for every 7 gallons of water. The bivalves are allowed to remain in the acid solution until the shells are open and unable to close when exposed to air. In warm weather immersion for 10 minutes to 1 hour is sufficient to produce this condition, while in very cold weather 2 to 3 hours may be required.

In commercial operations, for example, it is desirable to employ a colorimetric hydrogen-ion testing set in preparing and checking the pH (acidity or alkalinity) of the narcotizing solution. Several inexpensive and simple devices for this purpose are now on the market. The acid is thoroughly mixed with sea water or fresh water until a pH of 2 to 5 is obtained. The lower the pH the quicker the bivalves will become completely narcotized with opening of the shell, and the greater will be the action of the solution for destroying bacteria and spoilage organisms.

Though salts will likewise produce opening of bivalves they are much less suitable than acids as they cause dehydration and shrinkage of the tissues. Potassium chlorate ($KClO_3$) can be used at a concentration of 1 gram of salt per liter of water and will produce narcosis in 2 to 6 hours. Better results are obtained when the sulphates, chlorides, chlorates of potassium, calcium, etc. are used in a concentration of 1 gram per liter in acid sea water or fresh water having a pH of 3 to 5. However, for all practical purposes the use of an acid bath is preferable, cheaper and will open in the shortest possible time bivalves that have previously received physical stimulation.

In outlining practical procedures for opening the shell of bivalves it is not the intention of the inventors to limit their claims to the previously specifically mentioned physical and chemical agents and the quantities thereof. The effective physical stimuli may be applied also by centrifugal force, electric currents non-lethal temperature extremes and high frequency vibrations; also pressures, created by vacuum or otherwise, influence the rapid relaxation of the muscle of the organisms placed subsequently in chemical solutions herein described.

It is to be understood, however, that what is disclosed herein defines such terms as "shock", "shocking" and "physical stimulation" used in the appended claims.

Not only acids but alkalies and various other chemical substances may be successfully used to relax and suspend all activity of the bivalve muscles.

Any acid which is acceptable in connection with a food stuff; e. g., hydrochloric, carbonic, acetic, lactic, boric, formic, citric, tartaric may be beneficially employed. Other acids such as sulphuric, phosphoric, oxalic, tannic, salicylic, etc., will however produce muscular relaxation.

Alkalies such as ammonia and borax have been found suitable.

Of the alcohols, ethyl alcohol is one which could be used in producing the relaxation and opening.

Salts which may be used either alone after physical treatment or in combination with acids are iron, manganese and magnesium salts, potassium chlorate, etc. Many other salts may not directly aid in the relaxation process but in no way retard or hinder it and so may be used in combination with the acid treatment for purposes of improving the condition of the meats.

Ethers and esters are effective and may be used whenever such ethers and esters will not impair the flavor of the meat.

Hexamethylenamine is a very effective agent in this connection with possible therapeutic value.

Rotenone, made soluble in acetic acid or in acetone, is effective.

Nux vomica produces a high degree of stimulation resulting in muscular relaxation.

Chloroform and other specifically "narcotizing" reagents are all effective. Substances of the entire range of narcotics are effective although not always practical.

These substances and others of similar chemical nature may be used in such a way as to open the shell, causing relaxation of the muscle with no injury to the animal so that recovery from the treatment is possible.

This application finds its basis in and is a continuation of Investigational Report No. 15 of the U. S. Bureau of Fisheries on "New methods of opening oysters and improving their condition for market", a work done by us.

Having thus described our invention, what we claim and desire to secure by Letters Patent of the United States is as follows:

1. A process of treating bivalves for opening the same without injury thereto which comprises the steps of shocking the bivalves and treating the same with a non-injurious muscular relaxation chemical agent.

2. A process of opening bivalves which comprises the steps of shocking the same and thereafter administering to the bivalve a chemical having a muscular relaxation effect.

3. A process of opening and treating bivalves comprising the steps of shocking and then bathing the same in a treating chemical having a muscular relaxation agent and at the same time a purification agent.

4. A process by which bivalves are caused to open which is comprised of stimulating the same by physical and chemical agencies having narcotizing effects which cause the muscles to relax and the bivalve to open.

5. A process for causing muscular relaxation of bivalves which includes the step of bathing the same in an aqueous solution having a hydrogen-ion concentration of the range of pH 2 to pH 5.

6. A method of treating bivalves which comprises the step causing them to temporarily open by means of treating the same in an aqueous solution having a muscular relaxation effect, treating the interior of said bivalves, and thence returning the bivalves to a medium in which they could normally exist for the restoration of the bivalve.

7. A process by which the muscles of bivalves are caused to relax which consists of bathing the bivalves in a solution of approximately 2 cubic centimeters of hydrochloric acid (HCl) to each liter of water.

8. A process for treating bivalves which comprises treating them with a solution of acetic acid ($CH_3COOH$) in the ratio of approximately 4 ounces thereof to each 7 gallons of water.

9. A process of treating bivalves comprising the treating thereof with a solution of water and potassium chlorate ($KClO_3$) approximately at a concentration of 1 gram of salt per liter of water.

10. A process for treating bivalves which comprises the treating thereof with a solution of water and an acid having a muscular relaxation effect, said solution having a hydrogen-ion concentration of the range of pH 2 to pH 5.

11. A process for treating bivalves which comprises the treating thereof with an alkaline solution having a muscular relaxation effect, said solution having a hydrogen-ion concentration of the range of pH 9 to pH 10.

12. A process by which bivalves are caused to open comprising the step of treating the same with an aqueous solution containing a salt, sufficient in concentration to produce a hydrogen ion concentration such as will produce muscular relaxation of the bivalves.

13. A process for treating bivalves comprising the step of treating the same with an aqueous solution containing at least one of such salts as salts of boron, manganese and those selected from the alkaline earth group.

14. A process for treating bivalves comprising the step of treating the same with an aqueous solution containing an acid sufficient to produce a solution having a hydrogen ion concentration of the range of pH 1 to pH 6.5.

15. A process for treating bivalves comprising the step of bathing the same in an aqueous solution containing an acid and a salt which yield hydrogen ions in such concentration as will cause muscular relaxation of bivalves.

16. A process by which bivalves are caused to open comprising the steps of placing the same in an aqueous solution containing an acid sufficient to produce a hydrogen ion concentration of the range of pH 1 to pH 6.5 and in such a salt as set forth in claim 13.

HERBERT F. PRYTHERCH.
VERA KOEHRING.